Feb. 28, 1967   R. W. TURNER   3,305,887
COATING DISPENSER AND APPLICATOR
Filed Nov. 6, 1964   6 Sheets-Sheet 5
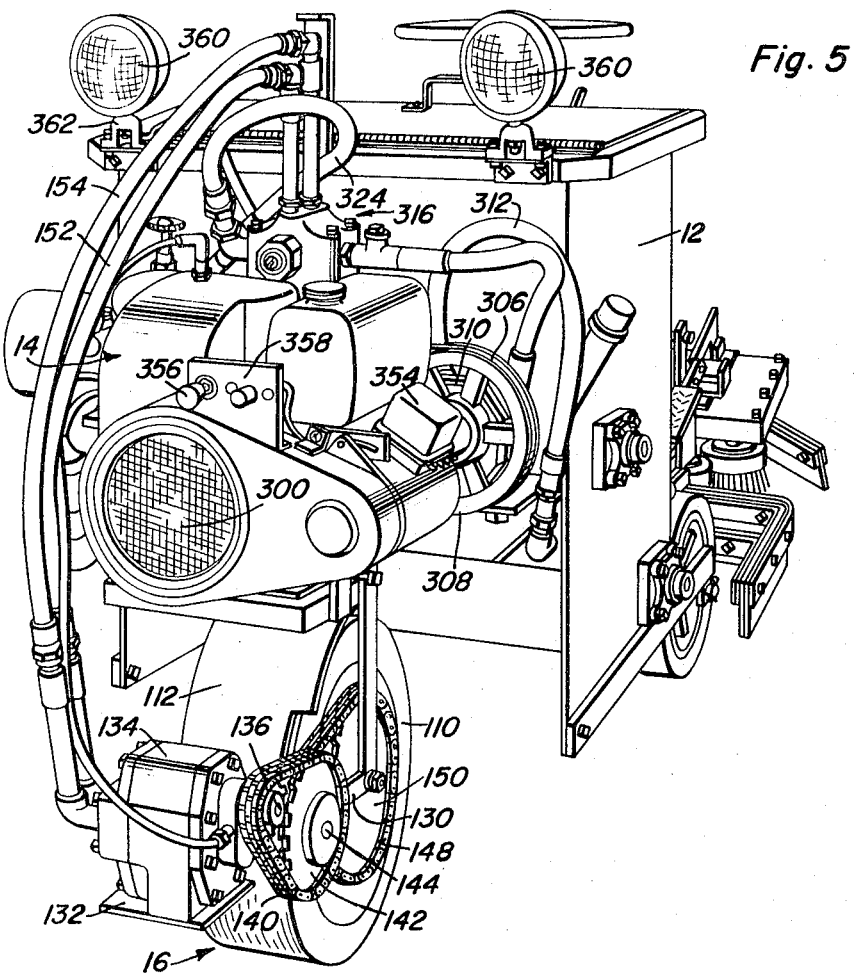
Fig. 5
Fig. 8
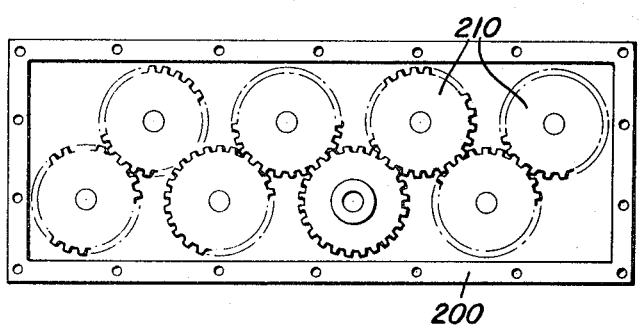
Robert W. Turner
INVENTOR.

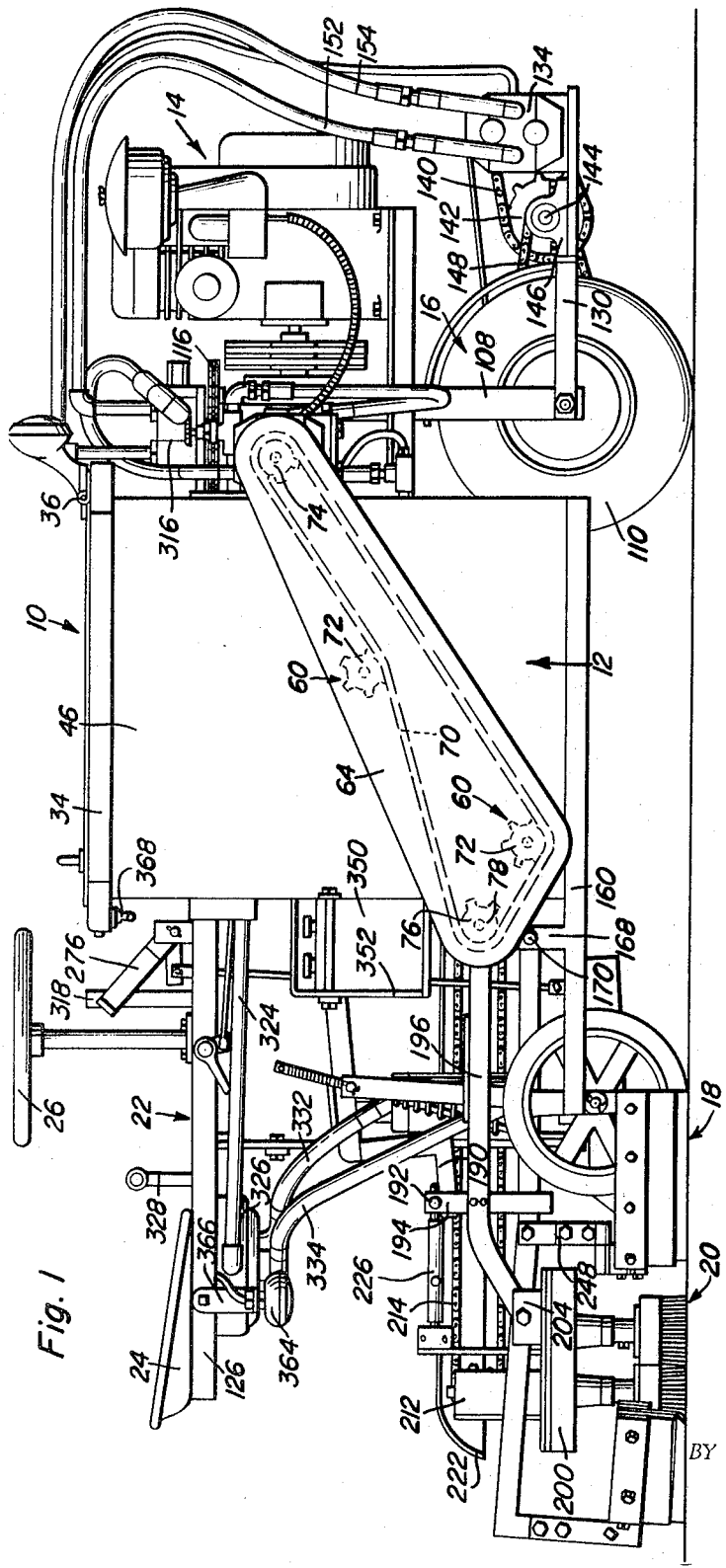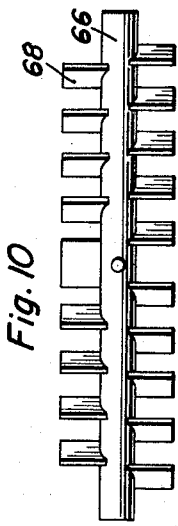
Fig. 1
Fig. 10
Robert W. Turner
INVENTOR.

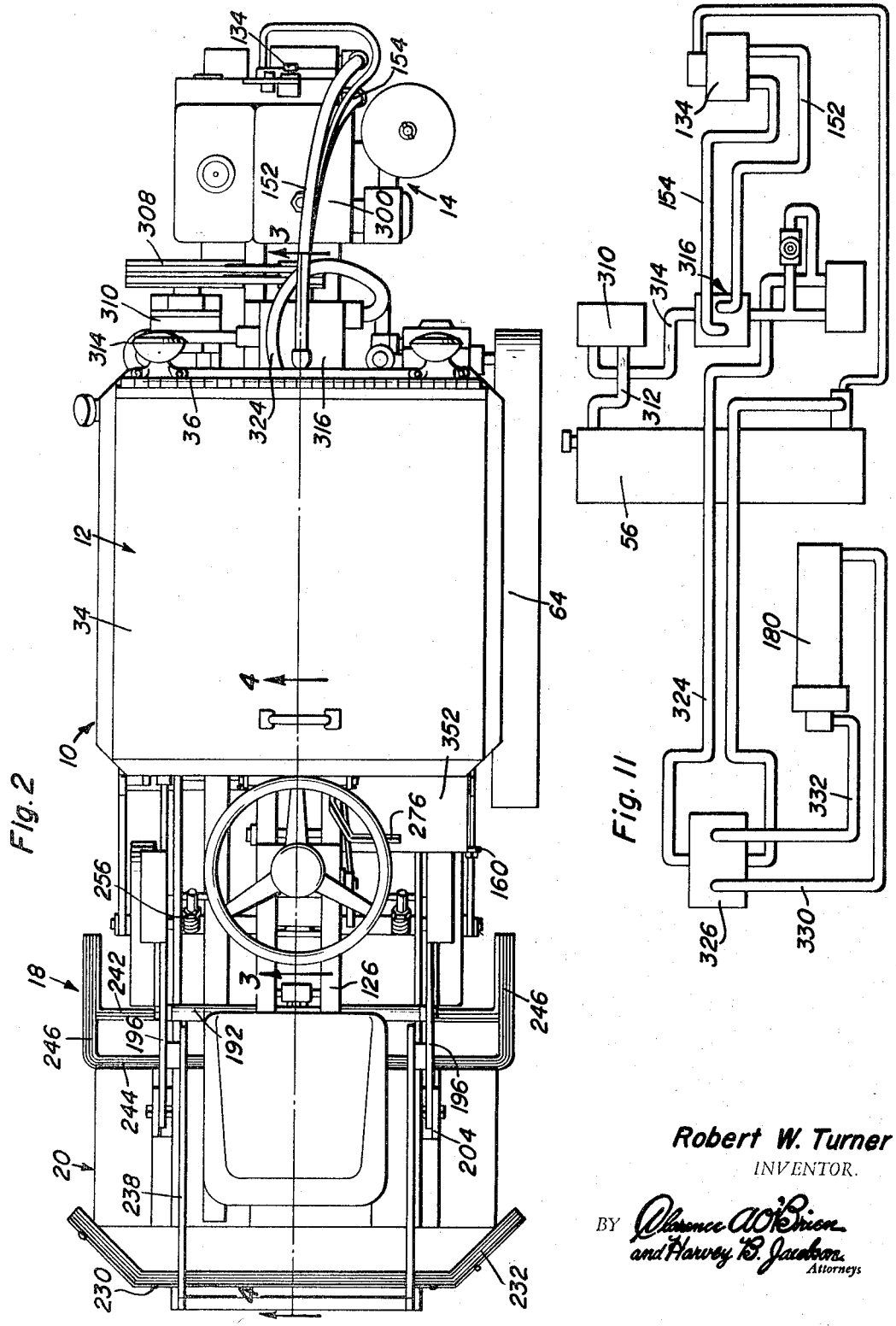

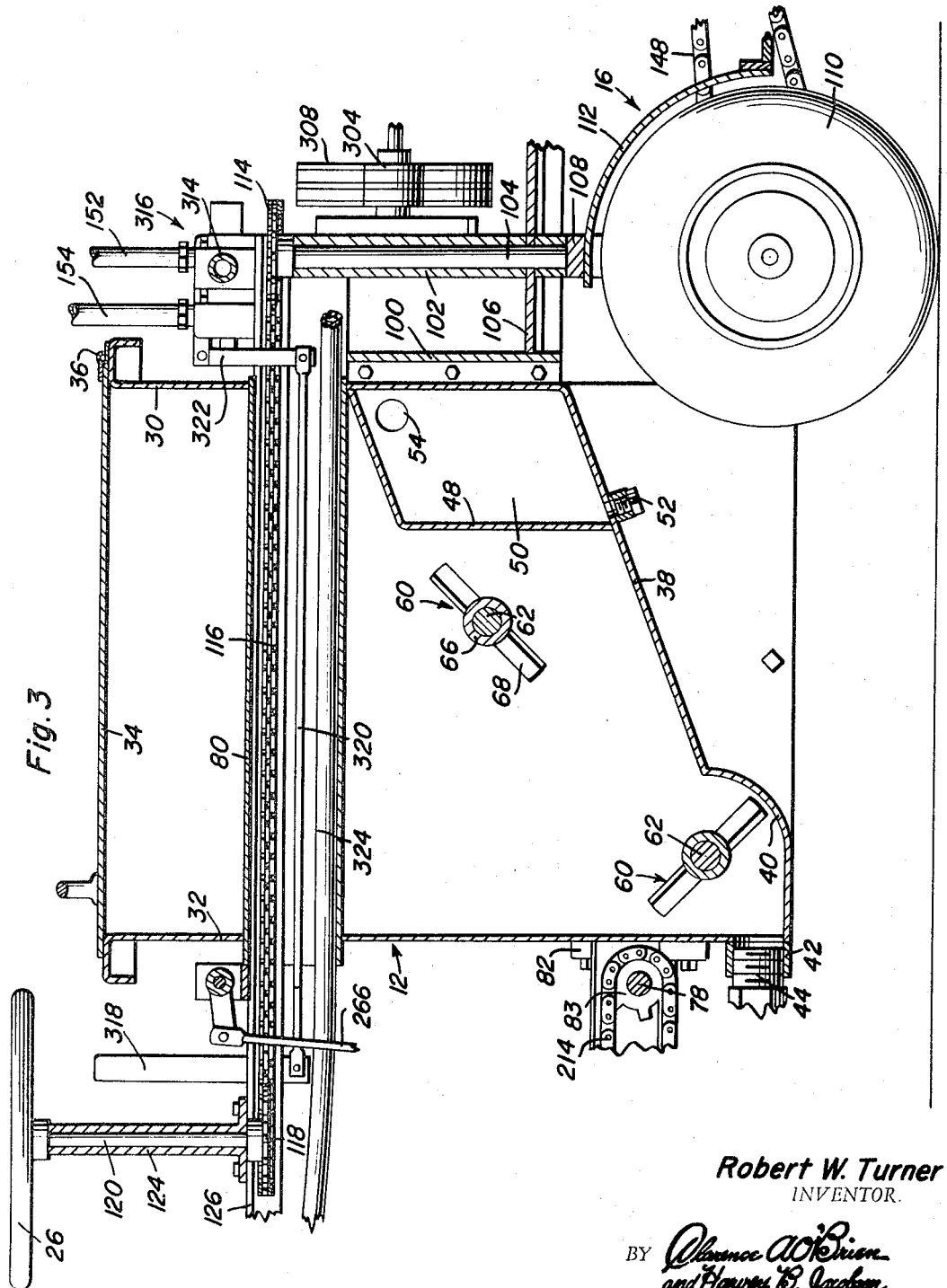

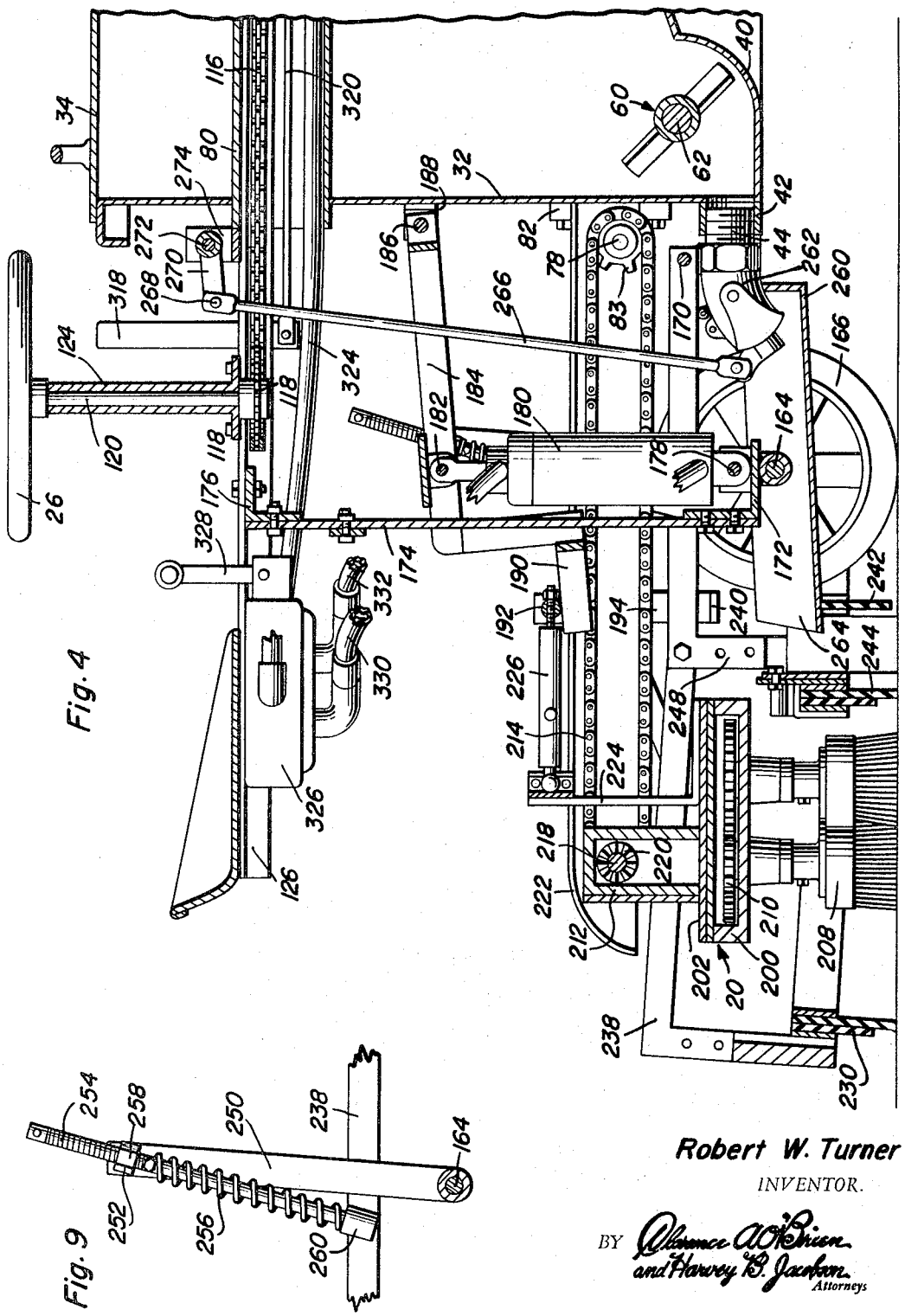

Feb. 28, 1967     R. W. TURNER     3,305,887
COATING DISPENSER AND APPLICATOR
Filed Nov. 6, 1964     6 Sheets-Sheet 6
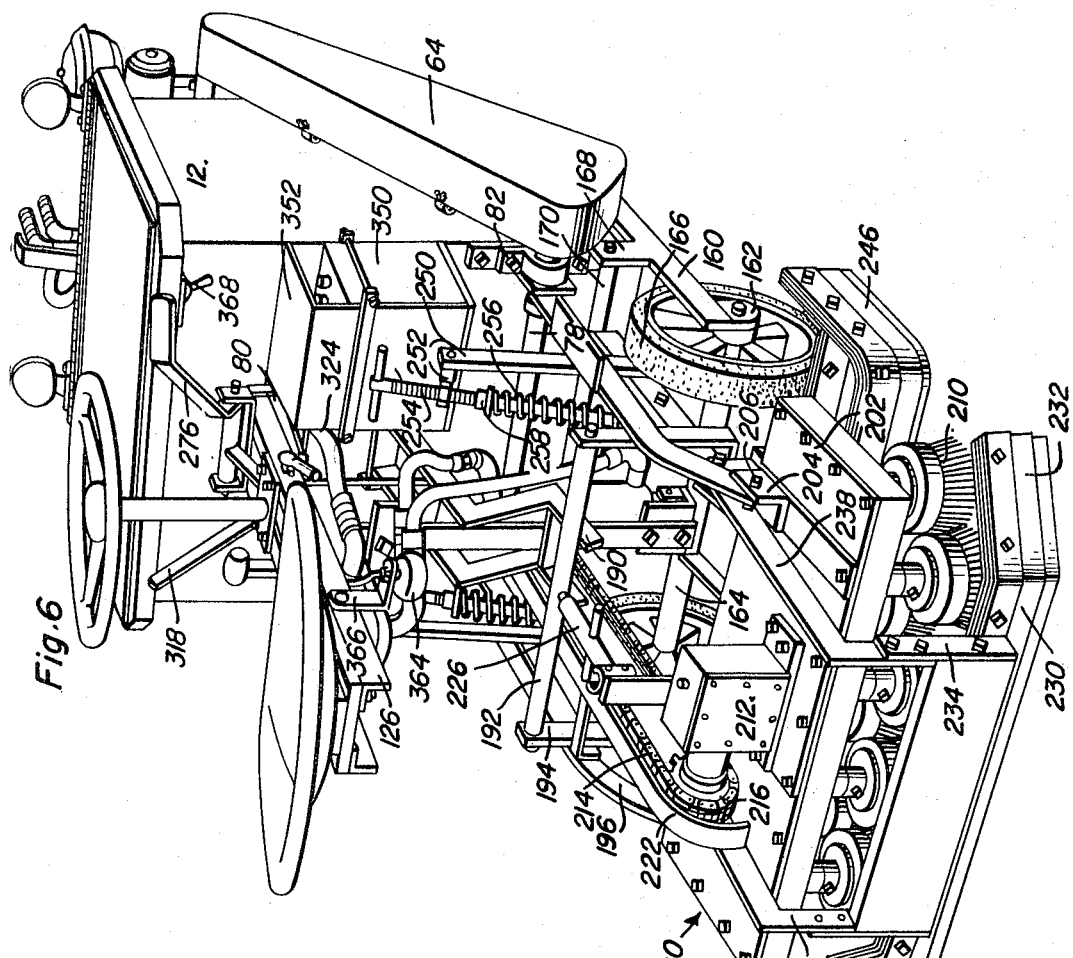
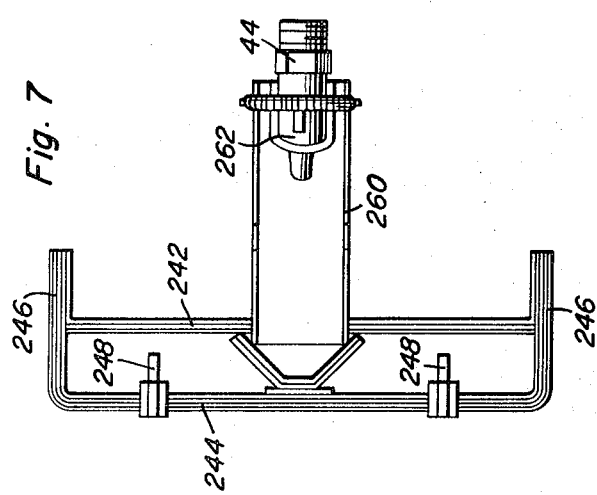
Robert W. Turner
INVENTOR.
BY Clarence A. O'Brien
and Harvey B. Jacobson
Attorneys United States Patent Office 3,305,887
Patented Feb. 28, 1967

3,305,887
COATING DISPENSER AND APPLICATOR
Robert W. Turner, Port Jefferson, Ohio, assignor to Turner Applicator Company, a corporation of Ohio
Filed Nov. 6, 1964, Ser. No. 409,429
10 Claims. (Cl. 15—50)

This invention comprises a novel and useful coating dispenser and applicator and more particularly pertains to a self-powered mobile apparatus for applying liquid coating material to such surfaces as pavements, roofs and the like.

The present invention is directed to an apparatus which is somewhat similar to that set forth in my prior Patents Nos. 2,517,057 of August 1, 1950, and 2,589,311 of March 18, 1952, but embodies important improvements thereover.

The apparatus set forth and claimed hereinafter is of a type specifically designed to apply a liquid coating material to surfaces such as pavements, roofs and the like and is especially characterized by the provision of improved means for most effectively and economically applying and spreading the coating material upon the surface to be treated and by a rotary scrubbing action effecting an intimate and long lasting application of the material to the surface and especially into the cracks and crevices thereof.

Efforts have been made heretofore to apply various coating materials to pavement and similar surfaces by either spraying the coating material upon the surface or by troweling it on the surface and thereafter attempting to spread the material over the surface. Both of such methods and apparatuses have resulted in a considerable waste of the material as well as to a less than adequate intimate bonding of the material coating to the surface to be treated.

It is therefore the primary object of this invention to provide an apparatus which will economically, efficiently and effectively apply a liquid coating material to pavement and other surfaces in a greater superior manner and entirely by mechanical means.

A further object of the invention is to provide a device in conformity with the foregoing object which shall be extremely compact in its nature and shall be self-powered.

A further and more specific object of the invention is to provide a surface coating apparatus in accordance with the preceding objects which shall achieve compactness by providing the liquid coating material storage tank or hopper at the mid-portion of the apparatus with the power plant for pulling the apparatus and for powering all of its mechanisms being disposed at the forward end of the apparatus on one side of the hopper and with the applicator assembly and the brushing assembly together with the driver's seat and steering wheel being disposed at the rearward side of the hopper.

A still further object of the invention is to provide a mobile self-powered liquid coating applicator for pavements and the like wherein the apparatus is propelled and all of its mechanisms are operated by a hydraulic fluid under pressure.

Still another object of the invention is to provide a device in accordance with the above mentioned objects wherein the coating applicator assembly and rotary brush assembly shall be vertically adjusted between a lowered operative position and an elevated inoperative position as desired.

It is a further object of the invention to provide a liquid coating surface treating device in compliance with the preceding objects wherein there is provided a single forward wheel constituting both a propelling and steering wheel for the device together with an improved means for applying power to the wheel for propulsion purposes and for steering the wheel from a location at the rear portion of the apparatus.

An additional important object of the invention is to provide a device in which compactness is attained by providing a tunnel through the liquid coating agent hopper and which tunnel receives a support means for the operator's seat, the steering mechanism, hydraulic fluid conduits and various control mechanism of the device.

Still another important object is to provide an apparatus according to the foregoing objects which shall have a self-contained power plant including a gasoline engine for rendering the device mobile together with a compactly mounted battery and a generator-starter unit operatively connected to the engine and battery and with a conveniently mounted starter switch for the generator-starter unit.

And a final important object to be specifically enumerated herein is to provide an apparatus of the character above set forth with an illuminating system which will effectively light the area adjacent to and about the device during its operation and will also clearly illuminate the area to which the coating material is being applied and brushed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a suitable embodiment of an apparatus in accordance with this invention certain concealed parts being shown in dotted lines therein;

FIGURE 2 is a top plan view of the apparatus of FIGURE 1;

FIGURE 3 is a view in vertical longitudinal section through the hopper and associated parts of the apparatus, being taken upon an enlarged scale substantially upon the plane indicated by the section line 3—3 of FIGURE 2;

FIGURE 4 is a further detail view taken in vertical longitudinal section through the rear portion of the device and in particular through the brush assembly and applicator assembly and associated parts, being taken upon an enlarged scale substantially upon the plane indicated by the section line 4—4 of FIGURE 2;

FIGURE 5 is a perspective view of the front portion of the apparatus and showing in particular the location of the power plant and its connection to the propelling and steering wheel of the device;

FIGURE 6 is a perspective view of the rear portion of the apparatus and showing in particular the mounting of the applicator and brush assemblies, of the operator's seat and of the steering wheel of the apparatus;

FIGURE 7 is a detail view in plan of the applicator assembly squeegee construction;

FIGURE 8 is a plan view of the gearing train for driving the rotary brush assembly of the apparatus;

FIGURE 9 is a detail view taken in vertical longitudinal section and upon an enlarged scale of a portion of the apparatus;

FIGURE 10 is an elevational view of one of the agitator units for the liquid coating material in the hopper; and FIGURE 11 is a diagrammatic view of the hydraulic system of the device.

The mobile self-propelled apparatus set forth hereinafter is specifically adapted to transport a large quantity of a liquid coating material such as an asphaltic or other sealing agent for concrete or other surfaces such as pavements, roadways and roofs; to economically apply the coating to such surfaces; to effectively clean the surfaces of dirt and the like and to intimately apply the coating to the surfaces by rotary brushing action; to improve the efficiency of the contact of the coating with the surface by dislodging air from crevices, cracks and the like and working by the rotary scrubbing action the liquid coating material into such cracks. The machine is characterized by its extremely compact arrangement of its various components, by its power and drive means consisting of a gasoline engine driving a pump which maintains pressure in a hydraulic conduit system serving both to propel the device and to power its various components and further by the mounting and operation of a single wheel at the forward end of the apparatus which serves both as a propelling wheel and as a steering wheel for the apparatus. An electric system including a compactly mounted battery and a starter-generator unit coupled to the engine is provided together with a conveniently located starter switch. In addition an illuminating system is included both to facilitate the efficient operation of the machine in dark areas at night and to clearly light the surface upon which the coating applicator and/or the brush assembly is working.

*General arrangement of the components of the apparatus*

In the accompanying drawings, reference being made first to FIGURES 1 and 2, the numeral 10 designates generally the apparatus in its entirety. The apparatus is of a mobile nature, having a mobile chassis or frame of which the liquid coating material hopper 12 comprises a centrally disposed and main component. At the forward end of the apparatus there is provided the power plant 14 and a combined steering and propulsion wheel assembly indicated generally by the numeral 16. At the rear of the apparatus there is provided an applicator assembly indicated generally by the numeral 18 and by means of which the liquid coating material is directly applied to the surface to be treated, a rotary brush assembly generally referred to by the reference numeral 20 and the driver's or operator's station indicated generally by the numeral 22 and which includes the driver's seat 24 and a steering wheel 26.

There is also provided a hydraulic system by means of which hydraulic fluid maintained under pressure by the power plant 14 is delivered to the various components of the device to perform the various functions thereof as set forth hereinafter.

*Hopper and tank assembly*

Referring now primarily to FIGURE 3 in conjunction with FIGURES 1, 2 and 4, it will be noted that the hopper 12 includes a tank of any suitable size and shape and of sufficiently heavy metal to support the attachment of various other elements of the mobile chassis of the device thereto.

The hopper 12 includes generally vertical front and rear walls 30 and 32 together with a top or closure 34 hinged thereto as at 36. The bottom wall 38 is inclined from the forward wall to the rearward wall terminating in a sump or pocket 40 at its rearward end with which communicates the internally threaded nipple 42 in which is received the discharge conduit 44 through which the liquid coating material is dispensed from the hopper. The hopper is completed by side walls 46 and it will be understood that any of these walls may be appropriately inclined as may be desired.

A wall 48 connected to the bottom wall 38 and one or more of the front and side walls of the hopper provides the hydraulic reservoir or chamber 50 which thus is located within the confines of the hopper itself. A drain plug 52 serves to drain this chamber when necessary and appropriate openings through which bores such as the openings 54 serve to permit the inlet and outlet of the hydraulic fluid during the operation of the hydraulic system of the apparatus.

Appropriately positioned in the hopper 12 are a plurality of agitator units each indicated generally by the numeral 60. It will be appreciated that any desired number of these units may be provided, two being indicated for the purpose of convenience of illustration. These units preferably comprise transversely extending power shafts 62 which are suitably journaled in the side walls of the hopper in a manner not shown and extend to the exterior of the side walls and into a gearing housing 64, see FIGURES 1, 2 and 6. Referring also to FIGURE 10 it will be observed that each agitator unit 60 includes a sleeve 66, through which extend radially disposed longitudinally spaced sets of blades 68. As shown in FIGURE 3, one of these agitators is preferably disposed in the sump 40 to facilitate discharge of the coating material from the hopper, while the functions of all of the agitators is to maintain the coating material well mixed in a homogenous state and viscosity.

Rotation is imparted to the agitators 60 by means of a sprocket chain 70 which is entrained over sprocket gears 72 upon the agitators, over a driving sprocket 74 and over a further driven sprocket 76 all disposed within the housing 64. As will be noted from FIGURE 1, the two agitators are preferably driven in opposite directions in the interest of effecting a more efficient mixing action within the hopper, although this particular arrangement is not critical as regards the purposes of this invention.

It will be further noted from FIGURE 3 that the hopper has a tunnel or conduit 80 extending therethrough from its front wall to its rear wall and thus defines a trough or channel through the hopper in which is disposed a number of components of the apparatus as set forth hereinafter. It will be further noted from FIGURE 1 that the driven sprocket gear 76 is mounted upon a shaft 78 which latter is journaled upon the exterior of the rear wall 32 of the hopper as by suitable bearings 82 as shown in FIGURES 3 and 4. The driven gear 83 and the shaft 78 thus comprises a power takeoff means for operating the roller brush assembly 20 as set forth hereinafter.

*Propulsion and steering assembly*

The propulsion and steering assembly as shown in FIGURE 3 includes a suitable supporting bracket arrangement 100 carrying a vertical bushing 102 in which is received a vertical spindle 104 which below the horizontal bracket component 106 is provided with a fork 108 within which is journaled the single propelling and steering wheel 110. The latter is provided with a wheel fender or shield 112 carried by the fork 108. At its upper end the wheel spindle 104 is provided with a sprocket gear 114 and a sprocket chain 116 which extends through the tunnel 80 of the hopper and is entrained about the steering sprocket 118 connected to the lower end of the steering axle 120 to which the steering wheel 26 is secured at the upper end. The axle 120 in turn is journaled in an upstanding sleeve 124 mounted upon a supporting frame 126 which extends through the tunnel 80. At its rear end the supporting frame carries the seat 24 previously mentioned and also the steering wheel 26 while the steering sprocket chain 116 is disposed within the frame 126.

Referring now especially to FIGURES 1 and 5 it will be observed that the lower end of the steering spindle fork 108 carries a forwardly projecting carriage 130 which extends forwardly of the steering and propelling wheel and has a platform 132 positioned at its forward end. Upon the platform 132 there is mounted a hydraulic motor 134 whose driving shaft 136 is provided with a sprocket gear 138. A sprocket chain 140 is entrained about the sprocket gear and about a further sprocket 142 secured to the sprocket shaft 144 journaled in suitable bearings 146. A smaller sprocket gear, not shown, is also secured to the shaft 144 and by means of a sprocket chain 148 is connected to a large sprocket gear 150 secured to the wheel 110. It will thus be apparent that the hydraulic motor 134 is connected by the reduction gearing afforded by the sprocket drive means just described to the wheel 110 for applying power thereto. A pair of fluid conduits 152 and 154 serve to conduct hydraulic fluid under pressure to and from the hydraulic motor 134 from the source of power as set forth hereinafter.

It will thus be apparent that the operator from his seat at the rear of the machine and through the steering connection extending through the tunnel in the hopper can rotate the wheel spindle 104 and thus steer the machine by the combined propelling and steering wheel 110. Further, propulsive force is applied to the wheel 110 by hydraulic fluid under pressure through the motor 134, the sprocket chain and the sprocket chain drives, both the motor and the reduction gearing assembly therefor being mounted upon and carried by the steering wheel assembly.

Brush and applicator assemblies

As shown in FIGURES 1, 4 and 6 a pair of rearwardly extending frame members 160 or beams are each rigidly secured to one of the sides 46 of the hopper 12 at the bottom edge thereof and project rearwardly therefrom. At their rearward ends, the members 160 are provided with depending journal bearings 162 between which bearings journal a transverse axle 164 by which a pair of rear supporting wheels 166 are carried. It will thus be apparent that the single front wheel 110 and a pair of rear wheels 166 support the apparatus and render it mobile.

Projecting upwardly from the horizontal frame members 160 and forwardly of the axle 164 is an upstanding bracket 168 and a transverse shaft 170 is journaled between the pair of brackets of the two frame members serving as a pivotal support for a purpose to be subsequently set forth.

Referring to FIGURE 4 it will be observed that a horizontally extending support bracket or shelf 172 is journaled upon the mid-portion of the axle 164 and is secured by a vertical frame member 174 and a bracket 176 to the supporting frame 126. Mounted upon the horizontal bracket 172 by pivotal connection 178 at its lower end is a hydraulic lift cylinder 180 whose piston is pivotally connected at 182 to a lift fork 184. The latter is pivoted at 186 to mounting brackets 188 on the rearward wall 32 of the hopper 12. Thus, the thrust of the lift cylinder 180 is carried by the wheels 166 and their axle 164 to effect vertical swinging movement of the lift fork 184. The latter includes at its rearward end a pair of parallel lift fingers 190 which are disposed beneath and are adapted to lift a transversely extending rod 192. The latter has its end secured in a pair of lifting bars 194 and with these bars constitutes a lifting bale.

The pair of lift bars 194 in turn are fixedly secured to a pair of longitudinally extending lift arms 196, see FIGURES 1 and 6, whose forward ends are pivoted upon the previously mentioned shaft 78 for free swinging movement thereon. The rearward ends of the members 196 are connected to the brush assembly 20 previously mentioned for raising and lowering the latter upon actuation of the lift cylinder 180.

Referring now especially to FIGURES 4 and 6, it will be seen that the brush 20 includes a horizontally extending box-like casing or housing 200 having a removable top 202 upon which is secured a pair of pivot brackets 204 to which the previously mentioned lift levers 196 are secured as by bolts or pivots 206. A plurality of rotary brushes 208 are journaled in and depend from the brush housing 200 being provided with gears 210 within the housing and which gears are in mesh with each other as shown in FIGURE 8. Disposed upon the top cover 202 of the housing is a gearing assembly housing 212 and to which power is supplied as by a sprocket chain 214 connected to the sprocket gear 83 from the agitating unit drive means. Upon the housing 212 is an external sprocket gear 216, see FIGURE 6, driven by the sprocket drive chain 214, the shaft 218 carrying the sprocket gear 216 and a bevel gear 220, see FIGURE 4, within the housing 212 on the shaft. The bevel gear in turn is connected to the plurality of brush gears 210 by a suitable gear train, not shown. Thus, power is supplied to all of the series of rotary brushes to cause them to revolve about vertical axes. A suitable shield or guard enclosure 222 is provided to enclose the sprocket chain 214, at least upon one side thereof.

Means are provided for effecting a tilting of the brush assembly about the horizontal axis provided by its support pivots 206. For this purpose there is provided an upstanding bracket 224 secured to the brush gearing housing 200 and the upper end of this bracket is pivotally connected by an adjustable turnbuckle or the like 226 to the previously mentioned transverse shaft 192. By adjusting the length of the turnbuckles it is evident that the anchoring of these two ends of the shaft 192 and the brackets 224 will effect a tilting or swinging of the brush assembly about the horizontal axis of its pivots 206 upon the lift levers 196.

Disposed rearwardly of and extending toward the sides of the brush assembly 20 is a squeegee blade construction. This includes a vertical squeegee blade construction 230 having angulated, forwardly projecting wings or ends 232. The squeegee blade assembly is carried by supporting brackets 234 which in turn are carried by the lower ends 236 of a pair of lift arms 238. The latter have their forward ends pivoted upon the transverse shaft 170 carried by the lugs 168 previously mentioned. Upward tilting of the lift arms 238 is effected by the inturned flanges 240 provided upon the lower ends of the lift bars 194. Thus, when the lift bars are elevated sufficiently, these inturned ends or flanges will engage under the lift arms 238 and thus tilt the latter upwardly thereby lifting the squeegee assembly out of contact with the surface being treated by the brushes.

The lost motion provided between lifting of the brushes and the lifting of the squeegee assembly enables both the brush pressure and the squeegee pressure on the pavement or surface being treated to be independently controlled.

It will be noted that there is also provided for the applicator assembly 18 a squeegee blade arrangement. This includes a box-like arrangement consisting of transversely extending front and rear squeegee blade constructions 242 and 244 together with side blade constructions each indicated by the numeral 246. A supporting means 248 connects the rear blade assembly 244 to the lift arms 238 for raising and lowernig therewith together with the squeegee assembly of the brush assembly.

Means are provided for resiliently urging the squeegee blade assemblies downwardly against the surface being treated. For this purpose there are provided a pair of upstanding standards 250 whose lower ends are carried by the axle 164 and its upper ends are provided with laterally inwardly projecting members 252 through which are threaded adjusting screws 254. Compression springs 256 surround these adjusting screws and are abutted against the adjusting nut 258 at one end and at their other end bearing against suitable abutments on the lift levers 238 to thereby adjustably and yieldingly adjust the latter downwardly. Such an abutment is indicated at 260 in FIGURE 9.

The coating material is supplied to the interior of the applicator squeegee assembly by means of a trough 260 whose upper end is disposed beneath the valved outlet 262 of the member 44. The open lower rear end of the trough 260 indicated at 264 discharges into the box-like chamber within the squeegee blades 242, 244 and 246. Thus, the coating material applied thereto will be spread by the squeeege blades uniformly over the area to be treated during travel of the apparatus.

In order to control the valved outlet 262, there is provided a vertically extending control rod 266 connected thereto. At its upper end, the control rod 266 is pivoted at 268 to the lever arm 270 mounted upon a pivot shaft 272 journaled in the bracket 274 upstanding from the supporting frame 126 and disposed forwardly of the steering wheel 26. An actuating lever 276, see FIGURE 1, is disposed adjacent the driver whereby the pivot shaft 272 may be rocked and thus through the rod 266 may open or close the valve opening 262 and thus regulate flow of the coating material from the hopper to the applicator assembly.

Power and control means

As previously mentioned, the various components of this apparatus are actuated by hydraulic fluid under pressure. For this purpose, the power plant 14 includes a suitable source of power such as an internal combustion engine 300 having a fuel tank 302 secured thereto and which by means of a pulley 304 and a belt drive 306 drives a pulley 308 by which a hydraulic fluid pump 310 is actuated. The oil pump as shown in FIGURE 11 has an intake conduit 312 communicating with the hydraulic fluid tank 56 and a delivery conduit 314 by which hydraulic fluid under pressure is supplied to the various components of this apparatus.

The hydraulic fluid pressure conduit 314 communicates with a control valve indicated generally by the numeral 316 and which is mounted upon the forwardly extending end of the support frame 126. A manual control lever 318 is connected by a rod 320 extending through the tunnel 80 of the hopper and is connected to the selector valve 316 for operation of the latter as shown in FIGURE 3.

For this purpose the selector valve itself has an actuating lever 322 by which the selector valve is operated.

The previously mentioned pair of fluid supply and exhaust conduits 152 and 154 connected to the fluid motor 134 which propels the vehicle are connected to the selector valve 316. Thus, by properly manipulating the valve, the supply of hydraulic fluid to the motor is controlled and may be reversed thus affording full control of the propulsion of the vehicle.

The selector control valve is further provided with a conduit 324 which as shown in FIGURES 1–6 extends through the tunnel to a further control valve 326 operated by a manual control, means 328. From the control valve 326 a pair of conduits as at 330 and 332 supply fluid to the opposite sides of the previously mentioned hydraulic lift cylinder 180 so that by manipulating the valve lever 328 the cylinder may be operated to thus raise and lower the squeegee assemblies.

The hydraulic fluid system is diagrammatically indicated in FIGURE 11 and in view of the foregoing is believed to require no further explanation.

Electrical and illuminating system

The apparatus, as above described, is quite satisfactory for many particular uses. However, in order to increase the mobility, ease of starting and handling of the apparatus, and particularly under conditions where the surface to be treated is inadequately lighted, an electrical and illuminating system is incorporated to the apparatus as follows:

Referring to FIGURES 1, 2 and 6 it will be observed that a conventional type of electrical storage battery 350 is provided which is compactly but conveniently mounted and housed in the battery housing or support 352 which may be conveniently mounted upon the rear wall of the hopper adjacent one side thereof in a sheltered but readily accessible position.

A motor generator unit 354, see FIGURE 5, is mounted upon the front portion of the vehicle and is suitably driven from the internal combustion engine, serving both as a starter for initiating operation of the engine and also as a means for charging the battery Thus, the apparatus is rendered highly mobile and independent of external power lines.

The electrical system further includes an illuminating system.

A starter switch 356 shown in FIGURE 5 is mounted upon a conveniently positioned support panel or bracket 358 at the front end of the machine and provides an accessible means whereby the starter can be energized and the internal combustion engine power plant is placed into operation.

In order to render its operation more effective in poorly lighted areas or after dark, the electrical system of the apparatus further includes an illuminating system. For this purpose there is provided a pair of headlights 360 each mounted upon suitable support brackets 362 upon the front of the apparatus as upon the front wall of the hopper 12. The headlights 360 are readily asjustable in order that they may efficiently illuminate the area about the machine and upon which it is working. Further included in the illuminating system is one or more work lights 364, see FIGURES 1 and 6, which are adjustably supported as by brackets 366 from beneath the seat 24 and upon the members 126. This light is adjustable upon its bracket so that it may be positioned to directly illuminate the applicator unit and/or the brush unit during their operation.

A control switch 368 which may be conveniently located as shown in FIGURE 1 below the rearward overhang of the top wall or cover of the hopper is provided to effect energization of the illuminating system.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mobile liquid coating apparatus comprising a wheeled frame having thereon a liquid coating material hopper and a power plant, means connected to said power plant for propelling said frame, an applicator assembly on said frame receiving coating material from said hopper and applying it to a surface to be coated, a brush assembly on said frame for scrubbing and spreading upon said surface the coating material applied thereto by said applicator assembly, means connected to said power plant and said brush assembly for operating the latter, said applicator assembly comprising a valve controlled outlet for said hopper, a squeegee assembly engaging the surface to be coated and enclosing said outlet and operable upon movement of said frame to spread said coating material over said surface, support means carried by said frame and carrying said squeegee assembly, and elevating means connected to said support means and operable to adjustably lift and lower said squeegee assembly.

2. The combination of claim 1 wherein said elevating means includes a hydraulic cylinder operated by said power plant.

3. A mobile liquid coating apparatus comprising a wheeled frame having thereon a liquid coating material hopper and a power plant, means connected to said power plant for propelling said frame, an applicator assembly on said frame receiving coating material from said hopper and applying it to a surface to be coated, a brush assembly on said frame for scrubbing and spreading upon said surface the coating material applied thereto by said applicator assembly, means connected to said power plant and said brush assembly for operating the latter, said brush assembly comprising a plurality of brushes each engageable with said surface to be coated, means operated by said power plant for actuating all of said brushes, a squeegee assembly engaging said surface to be coated and partially enclosing said brushes, and means connected to said frame and squeegee assembly for raising and lowering the latter.

4. A mobile liquid coating apparatus comprising a wheeled frame having thereon a liquid coating material hopper and a power plant, means connected to said power plant for propelling said frame, an applicator assembly on said frame receiving coating material from said hopper and applying it to a surface to be coated, a brush assembly on said frame for scrubbing and spreading upon said surface the coating material applied thereto by said applicator assembly, means connected to said power plant and said brush assembly for operating the later, an elevating means connected to said brush and applicator assemblies for raising and lowering them together, and a squeegee assembly for each of said brush and applicator assemblies and at least partially surrounding them and connected thereto for lifting and lowering therewith.

5. A mobile liquid coating apparatus comprising a wheeled frame having thereon a liquid coating material hopper and a power plant, means connected to said power plant for propelling said frame, an applicator assembly on said frame receiving coating material from said hopper and applying it to a surface to be coated, a brush assembly on said frame for scrubbing and spreading upon said surface the coating material applied thereto by said applicator assembly, means connected to said power plant and said brush assembly for operating the latter, said hopper forming the mid-portion of said frame, said power plant mounted upon and disposed forwardly of said hopper, and said brush and applicator assemblies being mounted upon and disposed rearwardly of said hopper, said hopper having a tunnel extending horizontally therethrough, a support frame disposed in said tunnel and having its front and rear ends supported by said wheeled frame, steering means carried by said support frame and extending through said tunnel, and control means for said power plant extending through said tunnel.

6. The combination of claim 4 including an illuminating device mounted upon the rear portion of said apparatus and directing light upon at least one of said brush and applicator assemblies.

7. The combination of claim 5 wherein said illuminating device is mounted upon said support frame at the rear portion of the apparatus and directs light downwardly upon at least one of said brush and applicator systems.

8. A self-propelled applicator comprising, a wheeled frame assembly having a forward driving wheel and rear supporting wheels, a material storing tank mounted by said frame assembly between the forward and rear wheels, a plurality of agitators rotatably mounted in spaced relation to each other within said tank, material distributing means mounted by the frame assembly rearwardly of the tank for dispensing and spreading material discharged from the tank, vehicle propelling means connected to the forward driving wheel forwardly of the tank, power take-off means connected to the material distributing means rearwardly of the tank, and transmission means connected to said agitators laterally of the tank and extending forwardly and rearwardly therebeyond for drivingly connecting the propelling means to the power take-off means.

9. The combination of claim 8 including illuminating means mounted by the frame assembly above the material distributing means for illuminating the same rearwardly of the tank.

10. The combination of claim 9 including a battery source of electrical energy mounted on the tank and connected to the illuminating means for energization thereof, and generator means driven by the propelling means for charging the battery source.

References Cited by the Examiner

UNITED STATES PATENTS

| | | | |
|---|---|---|---|
| 1,628,770 | 5/1927 | Finnell | 15—50 |
| 1,795,660 | 3/1931 | Mayer | 15—503 X |
| 2,044,558 | 6/1936 | Ball | 15—503 X |
| 2,317,843 | 4/1943 | Backlund | 15—50 |
| 2,589,311 | 3/1952 | Turner | 15—50 |
| 2,833,116 | 5/1958 | Rush | 15—83 X |
| 2,834,034 | 5/1958 | Angell | 15—79 |
| 2,847,689 | 8/1958 | Miller | 15—503 X |
| 3,006,021 | 10/1961 | Patch | 15—340 |
| 3,165,775 | 1/1965 | Lutz | 15—340 |
| 3,204,280 | 9/1965 | Campbell | 15—83 X |
| 3,233,274 | 2/1966 | Kroll | 15—340 |

CHARLES A. WILLMUTH, *Primary Examiner.*

E. L. ROBERTS, *Assistant Examiner.*